(12) United States Patent
Yoon et al.

(10) Patent No.: US 7,016,801 B2
(45) Date of Patent: Mar. 21, 2006

(54) SYSTEM AND METHOD FOR INTERCONNECTION ANALYSIS

(75) Inventors: Soo R. Yoon, Exton, PA (US); Paul E. Shappell, Elkton, MD (US)

(73) Assignee: The Boeing Company, Chicago, IL (US)

( * ) Notice: Subject to any disclaimer, the term of this patent is extended or adjusted under 35 U.S.C. 154(b) by 520 days.

(21) Appl. No.: 10/210,557

(22) Filed: Jul. 31, 2002

(65) Prior Publication Data

US 2004/0025085 A1    Feb. 5, 2004

(51) Int. Cl.
*G06F 11/00* (2006.01)

(52) U.S. Cl. .......................... 702/117; 714/25

(58) Field of Classification Search ............ 702/57–59, 702/117–118, 182–185, 188; 714/1, 25, 714/47; 324/500, 512, 527–528
See application file for complete search history.

(56) References Cited

U.S. PATENT DOCUMENTS 5,889,954 A * 3/1999 Gessel et al. ............... 709/223

* cited by examiner

*Primary Examiner*—Edward Raymond
(74) *Attorney, Agent, or Firm*—Robert R. Richardson, P.S.

(57) ABSTRACT

A method and system are provided for interactively troubleshooting interconnections between systems. Data is inputted for a plurality of equipment segments for a plurality of systems. The data for the plurality of equipment segments is read. From and to endpoints of the equipment segments are calculated. Graphics data for the plurality of equipment segments is automatically generated, and the graphics data for the plurality of equipment segments is displayed.

26 Claims, 13 Drawing Sheets

REPORT NO 913-34-01
10:06:28 PAGE 46

WIRE LIST

———————— FROM ————————    ———— TO ————    07/18/2001

| WIRE NUMBER | LNGTH FT-IN | COL | FAM | WIRE DIAG TYPE | WIRE HARNESS | ITEM | PIN LUG SPL | ITEM | PIN LUG SPL |
|---|---|---|---|---|---|---|---|---|---|
| W3510- 089 | -22 | | | EA | 146.13 145-E3510-200 | 146TB4 | 1G * | 146DS 6 | 1 $ |
| W3510- 090 | -22 1-6 | | | EA | 146.12 145-E3510-200 | 146TB4 | 1H * | 146DS 7 | 1 $ |
| W3510- 091 | -22 1-10 | | | EA | 146.12 145-E3510-200 | 146TB4 | 1J * | 146DS 8 | 1 $ |
| W3510- 092 | -22 2- | | | EA | 146.13 145-E3510-200 | 146TB4 | 1K * | 146DS 9 | 1 $ |
| W3510- 093 | -22 2- | | | EA | 146.11 145-E3510-200 | 146TB4 | 1L * | 146DS10 | 1 $ |
| W3510- 094 | -22 2-9 | | | EA | 146.11 145-E3510-200 | 146TB4 | 2B * | 146DS23 | 1 $ |
| W3510- 095 | -22 3- | | | EA | 146.11 145-E3510-200 | 146TB4 | 2C * | 146DS24 | 1 |

SYSTEM AND METHOD FOR INTERCONNECTION ANALYSIS

FIELD OF THE INVENTION

This invention relates generally to interconnected systems and, more specifically, to analysis of interconnections between components of interconnected systems.

BACKGROUND OF THE INVENTION

Complex electronics or mechanical systems often include sub-systems, or units, that are interconnected respectively by electrical wiring or fiber optic cables, or by piping, ductwork, structural members, or the like. Often, a complex system may be installed in a vehicle, such as an aircraft, a space vehicle, a ship, a submarine, a car, or the like. Alternately, a complex system may be installed in a land-based facility such as a power plant, or a building, or the like. Often, when a complex system is installed in a vehicle or a land-based facility, the complex system is interconnected to the vehicle or the land-based facility or to other systems installed in the vehicle or the land-based facility.

When faults are detected in a complex system, troubleshooting must be performed. For example, in an electronic system detected faults may arise as a result of faulty wiring interconnections, such as loose connections, broken wires, broken pins, misalignment between plugs and connectors, or the like. Troubleshooting such a fault using known troubleshooting techniques typically entails determining the circuits that are targets for causing the fault, determining which wiring diagrams or technical manual pages are applicable, locating and copying several volumes of paper documents of the applicable wiring diagrams, and tracing systems interconnections throughout the vehicle or land-based facility. A circuit must be identified, the endpoints of the wires must be determined, pages must be identified in the volumes of paper documents for the endpoints required, and the circuit must be traced across multiple pages of the volumes of paper documents from endpoint to endpoint. Typically, the circuit is highlighted across multiple pages and wire segment numbers are recorded on separate artifacts.

The process described above for troubleshooting also generally applies to development of statements of work for developing, replacing, deleting, or installing complex systems in vehicles or land-based facilities. Regardless of whether the above-described process is performed for troubleshooting or for statement of work preparation, manual tabulation of endpoints may be prone to error. Further, the above-described process is time-consuming and labor-intensive. Further, troubleshooting or statement of work preparation activities may come to a halt if a document containing necessary diagrams cannot be located. Conversely, commencement of troubleshooting efforts or statement of work preparation may be delayed until such a paper document containing a necessary diagram can be located.

Thus, there is an unmet need in the art for a method and system for automatically troubleshooting interconnections that does not rely upon availability of large volumes of paper documents that include necessary diagrams and information.

SUMMARY OF THE INVENTION

The present invention provides a method and system for interactively troubleshooting interconnections between systems. According to the present invention, troubleshooting can be performed automatically without large volumes of documentation and without the time and intensive labor used for tracing components across multiple pages from endpoint to endpoint. Instead, troubleshooting is automatically performed, in response to identification or selection by a user of interconnections or systems for which troubleshooting is desired.

According to one non-limiting embodiment of the present invention, a method and system are provided for troubleshooting wiring interconnections between electronic systems. Data is inputted for a plurality of wire segments for a plurality of electronic systems. The data for the plurality of wire segments is read and systems components from and to endpoints of the wire segments are calculated. Graphics data for the plurality of wire segments is automatically generated, and the graphics data for the plurality of wire segments is displayed.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, the present invention provides a method and system for interactively troubleshooting interconnections between systems. According to the present invention, troubleshooting can be performed automatically without large volumes of documentation and without the time and intensive labor used for tracing components across multiple pages from endpoint to endpoint. Instead, troubleshooting is automatically performed, in response to identification or selection by a user of interconnections or systems for which troubleshooting is desired. While a non-limiting embodiment is disclosed below illustrating an exemplary method and system for troubleshooting wiring interconnections in electronic systems, it will be appreciated that the present invention readily applies to other systems and other interconnections, such as without limitation optical systems and fiber optic cables and connectors, and mechanical systems and interconnections such as piping, ductwork, structural members, or the like.

Given by way of non-limiting example, a method and system are provided for interactively troubleshooting wiring interconnections between electronic systems. Data is inputted for a plurality of wire segments for a plurality of electronic systems. The data for the plurality of wire segments is read and from and to endpoints of the wire segments are calculated. Graphics data for the plurality of wire segments is automatically generated, and the graphics data for the plurality of wire segments is displayed.

Exemplary Method of the Invention

Figure 1A:
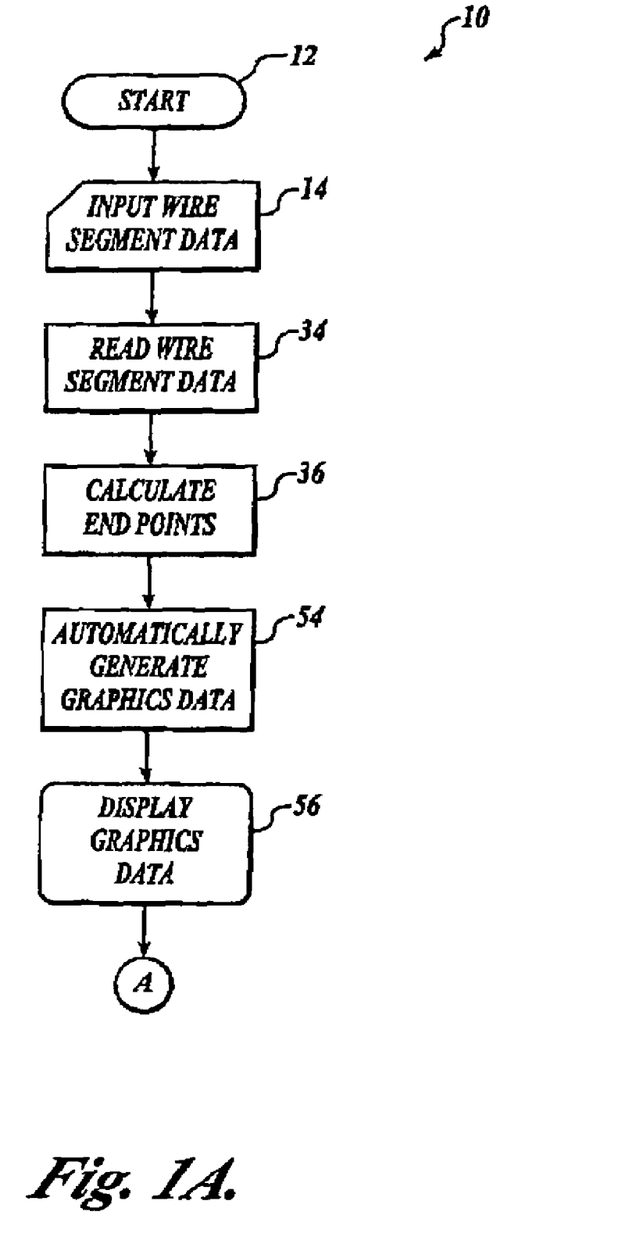
FIG. 1A, FIG. 1B, and FIG. 1C are flow charts of a method according to the present invention.
Figure 1B:
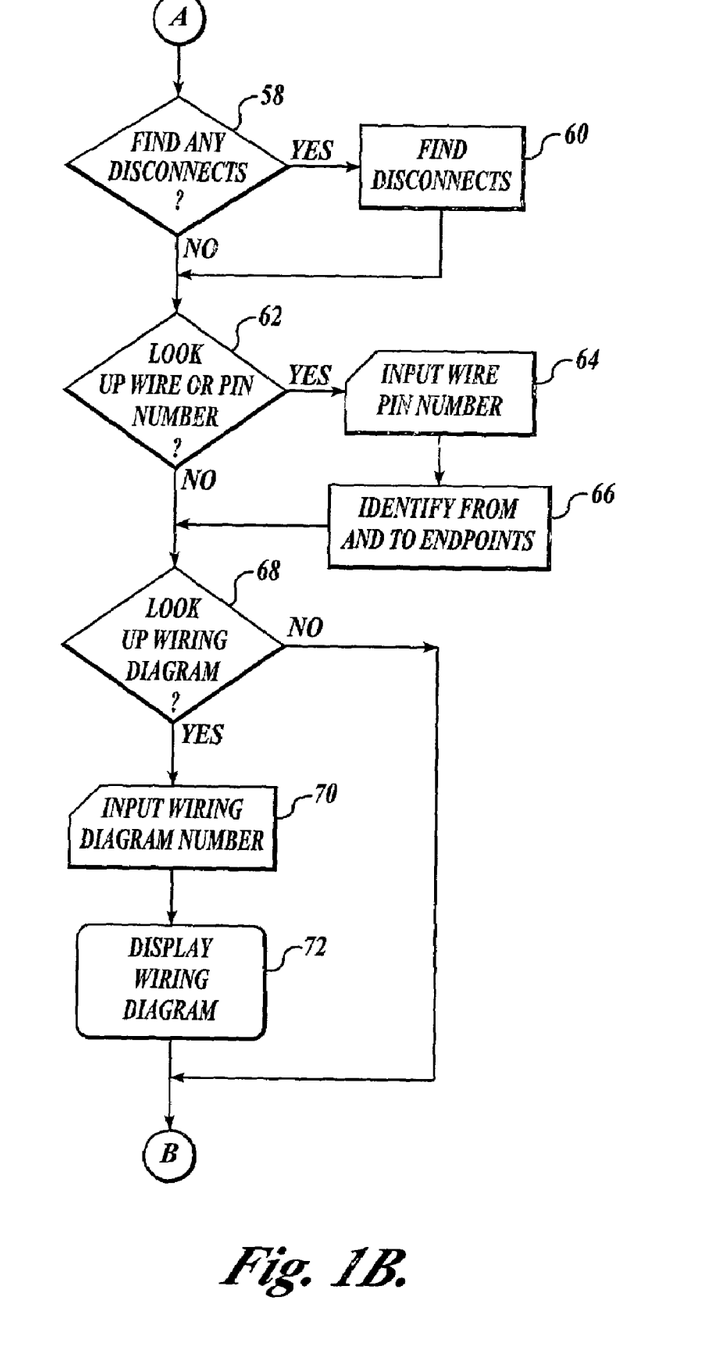
Figure 1C:
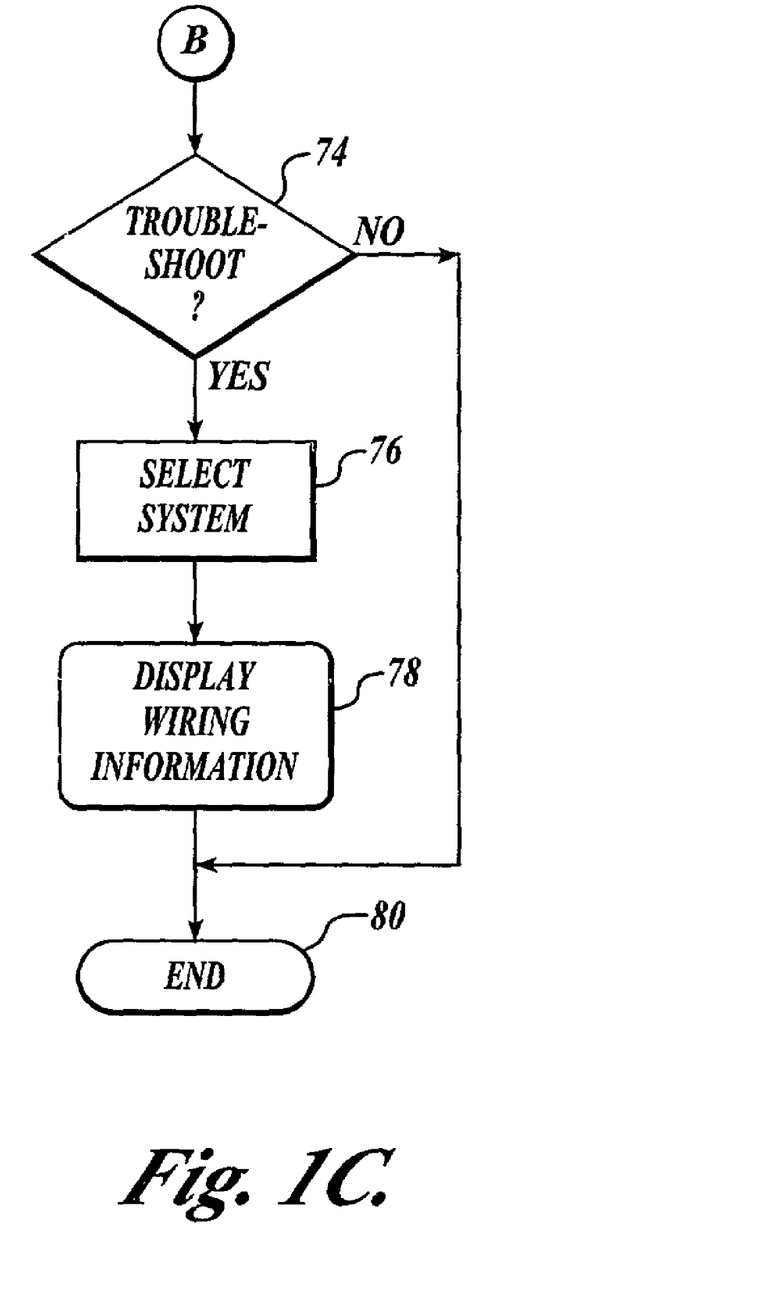
Figure 2:
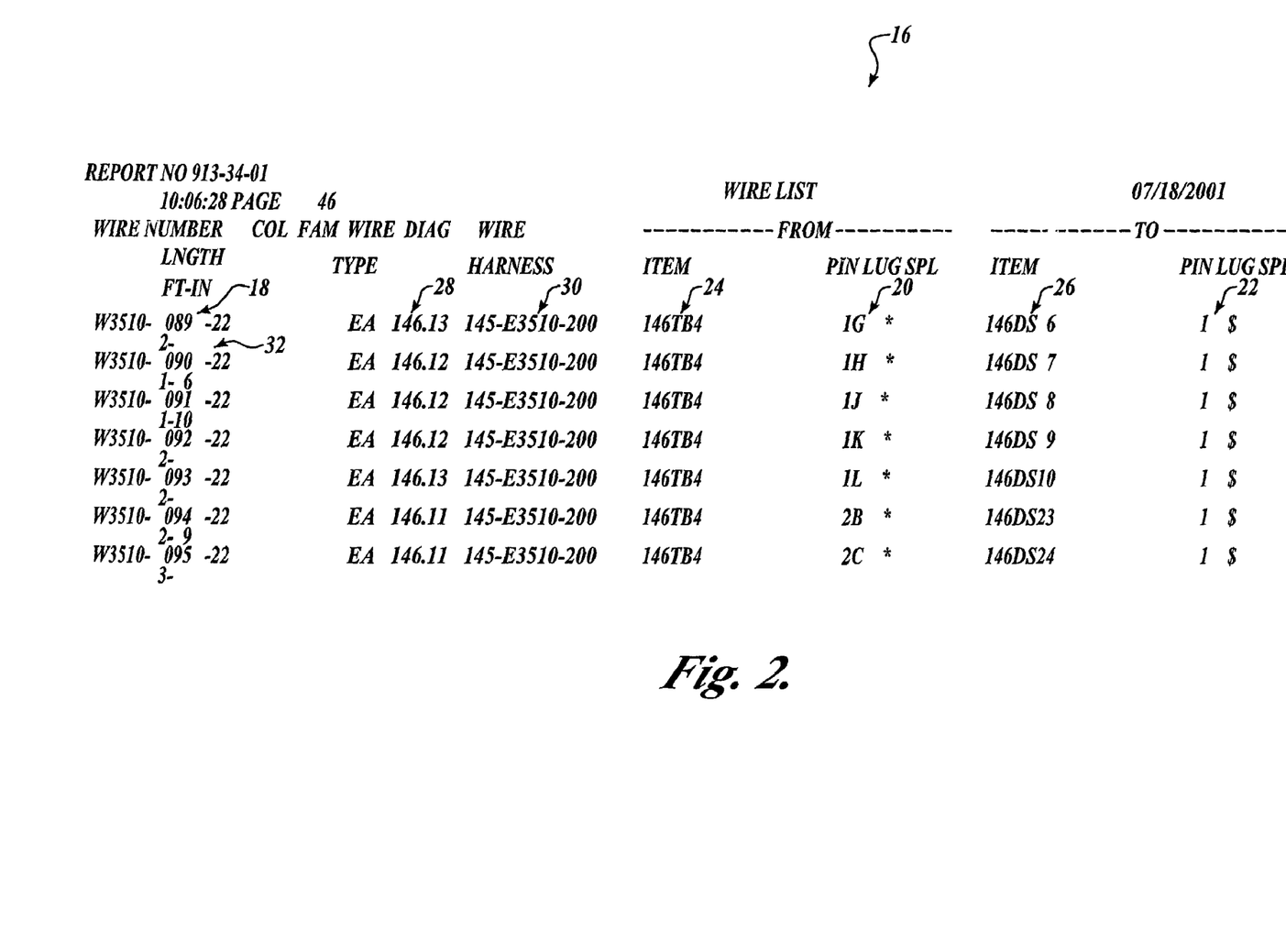
FIG. 2 is a table of data for wire segments.

FIGS. 1A, 1B, and 1C show one present, non-limiting embodiment of a method 10 for troubleshooting wiring interconnections between the components of electronics systems. The method 10 starts at a block 12. At a block 14, wire segment data for an entire vehicle or land-based facility is input. Given by way of non-limiting example, exemplary data for wire segments is shown in FIG. 2. Referring now to FIGS. 1A and 2, wire segment data is suitably entered in a table 16 in an acceptable, known manner. In one presently preferred embodiment, the table 16 defines a plurality of data fields for entering data. For example, a wire number, that is an identification number for a wire, is entered in a field 18. As is known, each wire terminates to a wire lug or at a pin inserted in a connector, such as without limitation a plug or a jack or the like, at an endpoint of the wire. For ease of understanding, the terms "plug" and "jack" will be used herein to describe connectors at endpoints of wires. Accordingly, it will be appreciated that types of connectors other than plugs and jacks are considered within the scope of the invention. That is, it will be appreciated that emphasis is placed on component endpoints, regardless of specific connectors used at the endpoints. According to the invention, data identifying the pin at the "from" endpoint is entered in a field 20, and data identifying a pin of the "to" endpoint is entered in a field 22.

If desired, metadata for each wire segment may be entered in a table 16. For example, an item associated with the from endpoint is entered into a field 24, and an item associated with the to endpoint is entered into a field 26. The item is suitably a unit, subunit, system, or the like that is installed and interconnected in a vehicle or a land-based facility. Given by way of non-limiting example, the item may be advantageously identified using known identification systems such as a MILSPEC specification protocol.

Other metadata may be entered if desired. For example, in the field 28 a wiring diagram number is suitably entered for identifying a wiring diagram that includes a wire segment identified in the field 18. In a field 30 is entered a number for a harness in which the wire segment identified in the field 18 is bundled. In a field 32 is entered length of the wire segment identified in the field 18. For example, in one presently preferred embodiment of the invention, the table 16 is an ASCII file. However, it will be appreciated that, in other embodiments, the table 16 is suitably created using known database tools, such as without limitation Oracle, Microsoft products, and the like.

Referring back to FIG. 1A, at a block 34, wire segment data is read from the table 16 (FIG. 2). The data populating the plurality of fields in the table 16 (FIG. 2) is read in an acceptable, known manner, depending on the application used to create the table 16. Given by way of non-limiting example, the data populating the fields in the table 16 (FIG. 2) is suitably read in any acceptable known manner used to read an ASCII file, an Oracle database, a Microsoft product file or the like.

At a block 36, the invention advantageously calculates system component endpoints for all of the wire segments that are interconnected within a vehicle or land-based facility. For example, several wire segments may be interconnected in any vehicle or land-based facility to form a concatenated chain of interconnected wire segments between system components. The concatenated chain begins at a from component endpoint, is interconnected through a plurality of wire segments and terminates to component endpoint to which no other wire segments are interconnected. As a further example, a wire segment may include one or more splices. As a result, a wire segment with one or more splices may include more than one from component endpoint or more than one to component endpoint. Advantageously, the present invention calculates all endpoints associated with each wire segment, regardless of whether wire segments are interconnected within a vehicle or land-based facility within a concatenated chain or are spliced.

Calculating the component endpoints of interconnected wire segments entails determining to which other wire segments or segments any given wire segment is connected. In one presently preferred embodiment of the invention, at the block 36, for each pin identified at a first connector such as a plug, a search is made for a pin at a second connector such as a jack that corresponds to the plug. Conversely, a search is performed for a pin at a plug that corresponds to a pin at an identified jack.

Figure 3:
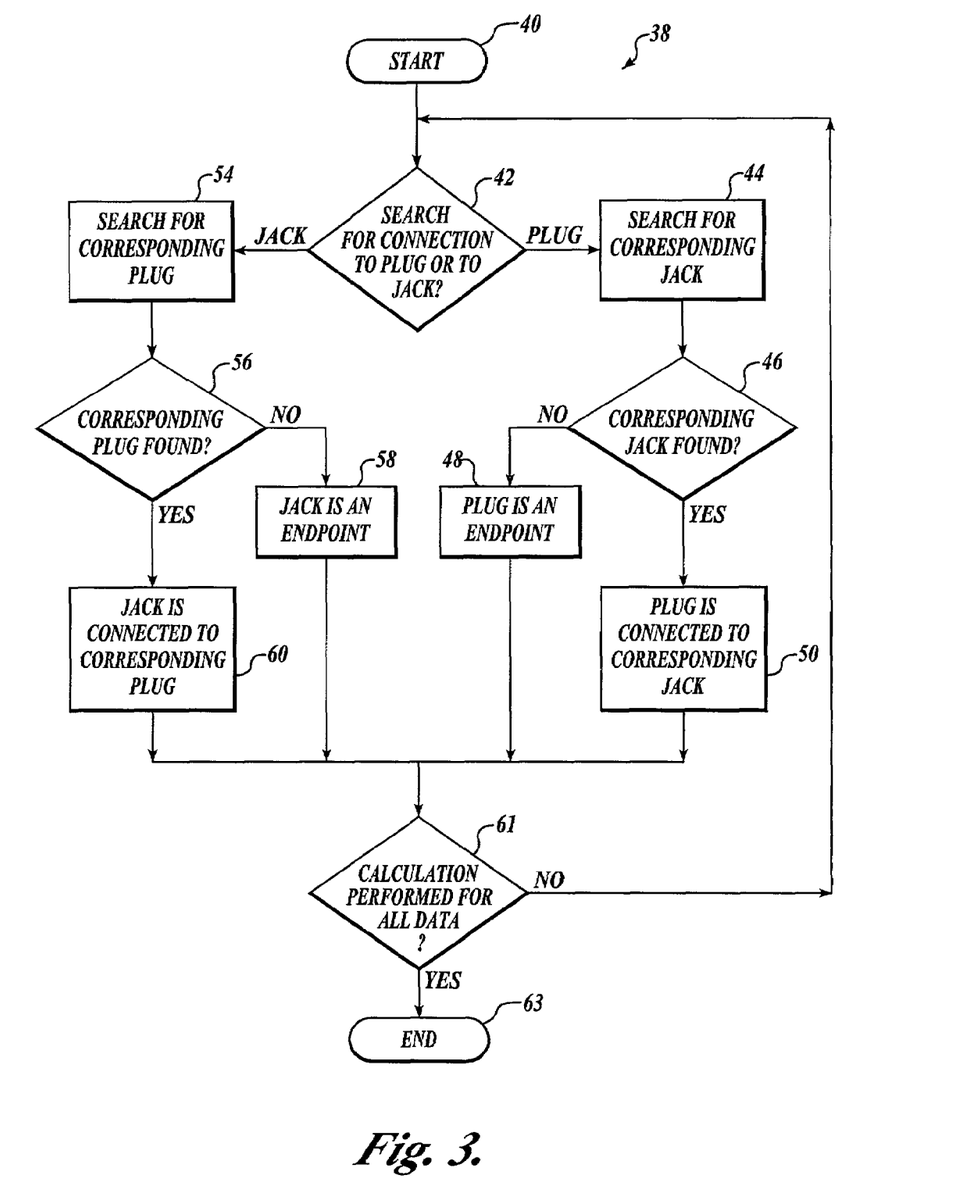
FIG. 3 is a flow chart of a routine for determining correspondence between plugs and first connectors.

FIG. 3 shows an exemplary routine 38 for determining connection between first and second connectors such as plugs and jacks. The routine 38 starts at a block 40. At a decision block 42, a determination is made whether to search for a connection to a plug or a connection to a jack. When the wire segment data read at the block 34 (FIG. 1A) is data for a plug, the routine 38 proceeds to a block 44. At the block 44, a search is performed for a jack that is connected to the plug. Given by way of non-limiting example, wire segment data read at the block 34 (FIG. 1A) includes a connector and pin 300P16_27. The connector and pin 300P16_27 will be connected to a connector and pin 300J16_27 if the pin 300P16_27 is connected at all. Accordingly, for wire W39-648-20 (FIG. 4), at the block 44 a search is made for a jack 300J16_27. Alternately, some protocols use a same reference designator, number, or the like for identifying all end points of an interconnection, such as a wire. In this alternate embodiment, a search is made for another instance of the same endpoint number. As such, a search for a corresponding second connector, such as without limitation a plug or a jack, having a different number identifier from that of a first connector is not necessary. At a decision block 46, a determination is made whether or not a corresponding jack has been found. If no corresponding jack is found, at a block 48, the plug is determined to be an endpoint. That is, no jack is connected to the plug. As such, the plug is ultimately a dead-end.

If at the decision block 46 a determination is made that a jack corresponds to a plug, then at a block 50 the plug is determined to be connected to the corresponding jack. As a non-limiting example, the plug 300P16_27 is determined to be connected to the jack 300J16_27.

Referring back to the decision block 42 (FIG. 3), when a determination is made that the data read at the block 34 (FIG. 1A) is data for a jack, then the routine 38 searches for a corresponding plug at a block 54 similar to the search for a corresponding jack at the block 44. At a decision block 56, a determination is made whether or not a plug corresponds to a jack in a manner similar to the decision block 46. At a block 58, the jack is determined to be an endpoint in a manner similar to the block 48. Finally, at a block 60, the jack is determined to be connected to the corresponding plug in a manner similar to the block 50.

The routine 38 is performed for each piece of wire segment data read at the block 34 (FIG. 1A). From the blocks 48, 50, 58 and 60, the routine 38 proceeds to a decision block 61 where a determination is made if the routine 38 has been performed for all wire segment data read at the block 34 (FIG. 1A). If the routine 38 has not been performed for all wire segments data, then the routine 38 returns to the decision block 42. If the routine 38 has been performed for all wire segment data, then the routine 38 ends at a block 63. It will be appreciated that a result of performing the routine 38 on all wire segment data read at the block 34 (FIG. 1A) is tabulated data that identifies from endpoints and to endpoints, including ultimate end-points and all wire segments in between the endpoints.

Referring back to FIG. 1A, at a block 54 graphics data is automatically generated. At the block 56, the graphics data is displayed. The graphics data is suitably generated at the block 54 for presenting to a user a representation of the endpoints calculated at the block 36. It will be appreciated that the results of the block 36, that is the endpoints for the wire segments, may be graphically displayed in a number of acceptable manners.

FIGS. 1B and 1C illustrate one present non-limiting embodiment of the invention that displays the graphics data in an exemplary manner such that further processing and manipulation of the wire segment data can be performed as desired for troubleshooting and other purposes. Referring now to FIG. 1B, a determination is made a decision block 58 whether or not a user desires to find any disconnects between two systems. That is, a user determines whether or not to find any dead-end connections that are endpoints of wire segments that interconnect two systems. Advantageously, system interconnections are determined at the block 36 (FIGS. 1A). If the user desires to find disconnects, then at a block 60 the disconnects between systems are determined. Systems are determined at the block 36 (FIG. 1A) to be interconnected are presented to the user, and the user selects the interconnected systems for determination of disconnects. As discussed above, systems associated with the wire segments were identified and entered as metadata at the block 14 (FIG. 1A). Because wire segment interconnections are determined at the block 36 (FIG. 1A) and because the systems associated with the interconnected wire segments are known, as a result the dead-end connections or endpoints of the wire segments can be associated with the systems associated with the wire segments.

From the block 60, the method 10 proceeds to a decision block 62. Also, when it is not desired to find any disconnects, the method 10 proceeds to decision block 62 from the decision block 58. At the decision block 62, a determination is made whether or not look up a wire number or a pin number. If it is desired to look up a wire number or a pin number, then at a block 64 the desired wire or pin number is input. At the block 66 the from endpoint and the to endpoints of the wire segment that is input are identified. Alternatively, when a pin number is input at the block 64 the other endpoint and the wire segment are identified.

From the block 66, the method 10 proceeds to a decision block 68. Also, when it is not desired to look at a wire number or a pin number, the method 10 proceeds from the decision block 74 to the decision block 68. At the decision block 68, a determination is made whether or not look up a wiring diagram. If it is desired to look up a wiring diagram, then at a block 70 the desired wiring diagram number is input. At a block 72, the desired wiring diagram is displayed. If desired, the displayed wiring diagram suitably includes a connector plug map.

Referring now to FIG. 1C, from the block 72 (FIG. 1B) the method 10 proceeds to a decision block 74. Also, when it is not desired to look up a wiring diagram, the method 10 proceeds from the decision block 68 (FIG. 1B) to the decision block 74. At a decision block 74, a determination is made whether or not to troubleshoot a system, piece of equipment, unit, or the like. If it is desired to troubleshoot, then at a block 76 a user selects a system for troubleshooting, and all wiring information pertaining to the selected system is obtained. As discussed above, association of wire segments with systems is input at the block 14 (FIG. 1A) and interconnections of wire segments are determined at the block 36 (FIG. 1A). As a result, all wiring information pertaining to any desired system is advantageously available for display. At a block 78 the wiring information pertaining to the selected system is displayed. The method 10 ends at a block 80. If it is not desired to troubleshoot, then the method 10 proceeds from the decision block 74 and ends at the block 80.

Exemplary Implementation of the Invention

FIGS. 4–10 are screen shots of an exemplary implementation of the invention. The screen shots of FIGS. 4–10 illustrate a non-limiting implementation of the invention that is suitable for troubleshooting wiring in a vehicle such as an aircraft. For example, the system numbering follows an equipment identification protocol that gives each equipment a unique identifier, as is well known in the art. However, it will be appreciated that any system number or equipment name may be used as desired for any application.

Figure 4:
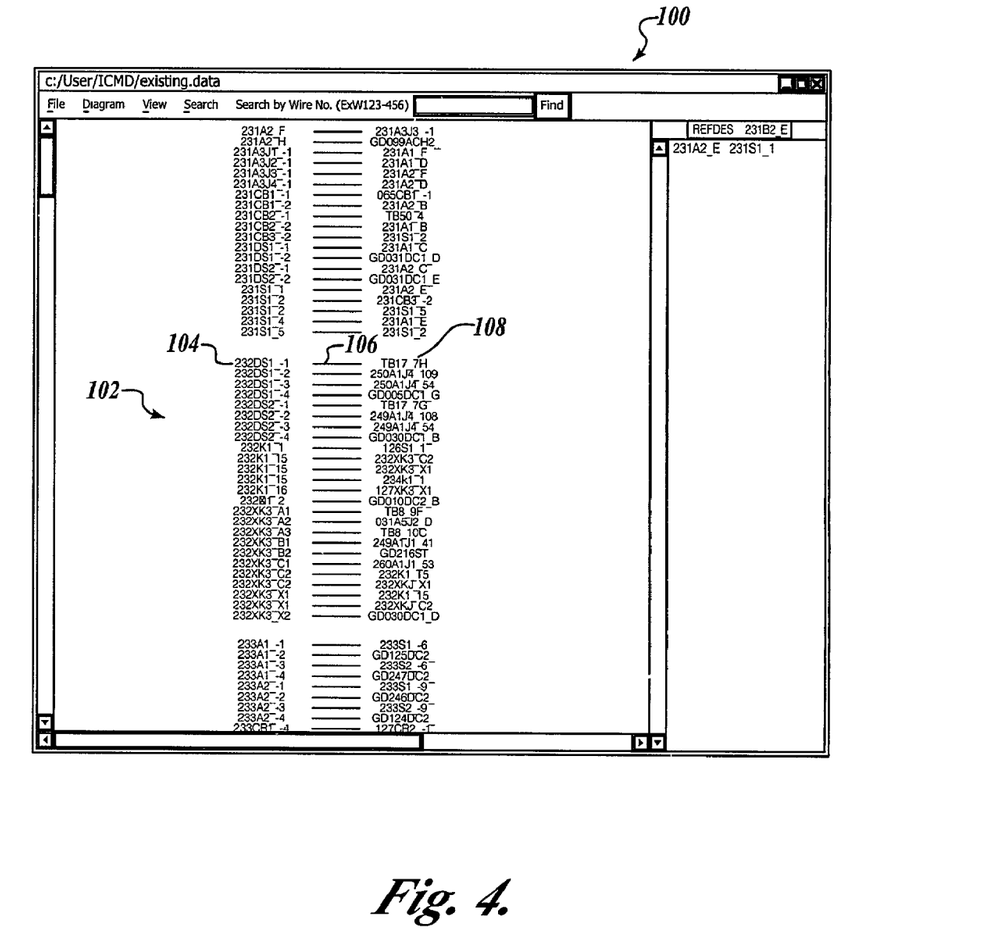
FIGS. 4–10 are screen shots of an exemplary embodiment of the invention.

Referring now to FIG. 4, a screen 100 shows graphics data that has been automatically generated from interconnections and endpoints calculated at the block 36 (FIG. 1A) from wire segment data input at the block 14 (FIG. 1A). A box 102 represents equipments or systems in a vehicle or a land-based facility. Given by way of non-limiting example, the box 102 represents boundaries of a system designated as System 232. As is known, System 232 is per MILSPEC for aerospace vehicles, and similar standards for tracking and filing systems data vehicles or land-based facilities exist in the industry. Numbering systems can also be arbitrarily assigned to provide unique identification at equipment termination points. Each line item entry in the box 102 represents pieces of equipment 104 that are endpoints in the system outlined in the box 102. That is, wire segments will be connected from the equipment 104. A line 106 graphically depicts an interconnection to an ultimate to endpoint 108. In this non-limiting example, the equipment termination point designated 232DS1__=2 is graphically connected to an endpoint at equipment termination point designated as 250A1J__109.

Figure 5:
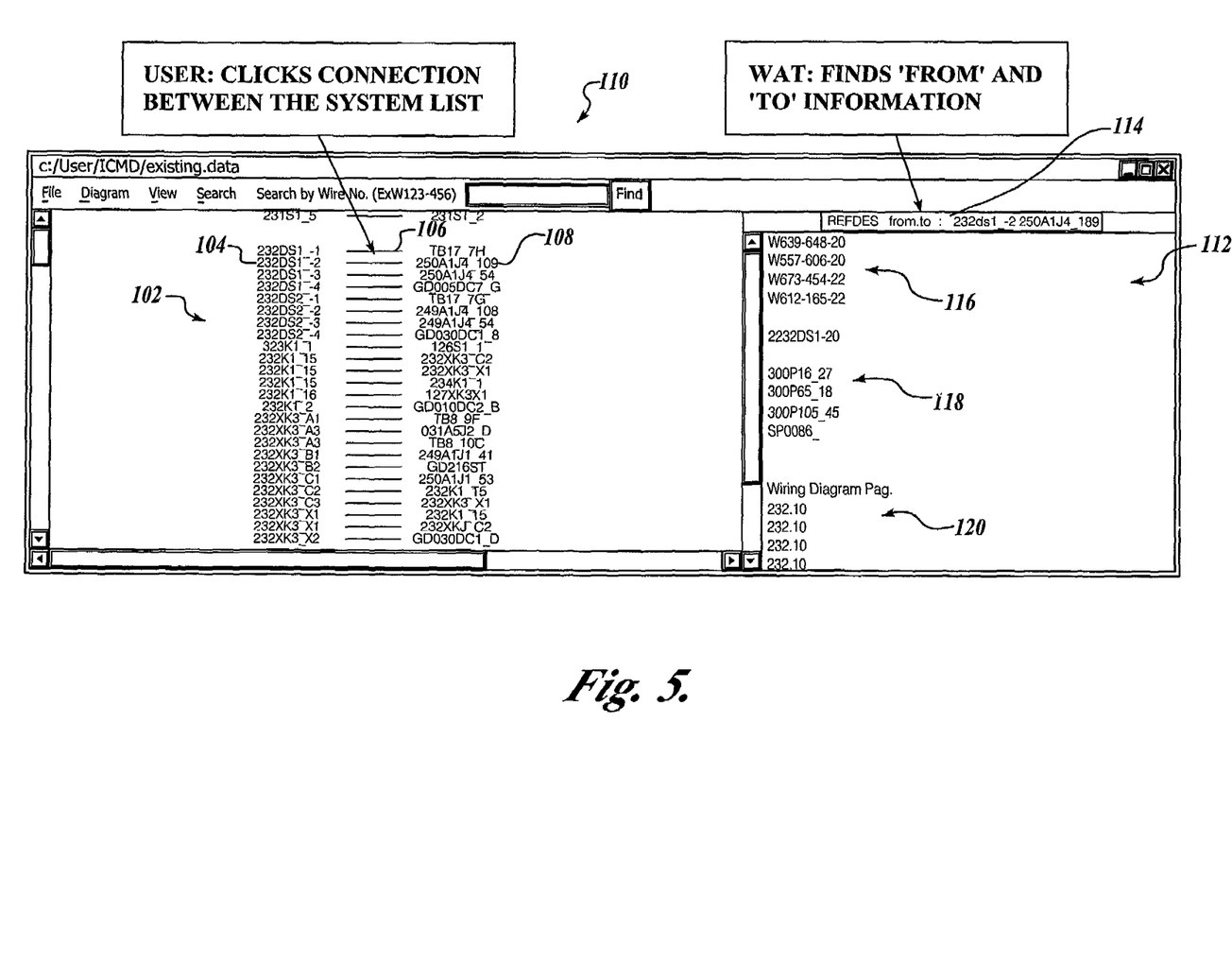

Referring now to FIG. 5, a screen 110 shows disconnects between systems. To find disconnects, that is ultimate dead-end connections of wire segments connected to a piece of equipment 104 within a system, a user clicks on the line 106 between the equipment 104 and the endpoint 108. A window 112 shows details of disconnects determined for the selected piece of equipment 104 and the selected endpoint 108. A box 114 summarizes the from and to information. In the non-limiting example show, the from equipment is from equipment termination point designated as 232DS1__=2 and the to endpoint is equipment termination point designated as 250A1J4__109. A field 116 includes wire numbers connected to a piece of equipment 104 that end in disconnects. In this non-limiting example, wire numbers W639-648-20, W557-606-20, W673-454-22, and W612-165-22 end disconnects. A field 118 shows connectors and pins that are the to endpoints of the wires indicated in the field 116. In the non-limiting example shown, the connector 300P16__27 is the to endpoint of the wire W639-648-20; the connector 300P65__18 is the to endpoint of the wire W557-606-20; the connector 300P105__45 is the endpoint of the wire W673-454-22; and the connector SP00__86 is the endpoint of wire W612-165-22. A field 120 shows wiring diagram pages for the wires indicated in the field 116. Additionally, any other data element loaded from the data at block 14 (FIG. 1A) can be obtained. In the non-limiting example shown, the wires W639-648-20, W557-606-20, W673-454-22, and W612-165-22 shown on wiring diagram page 232.10.

Figure 6:
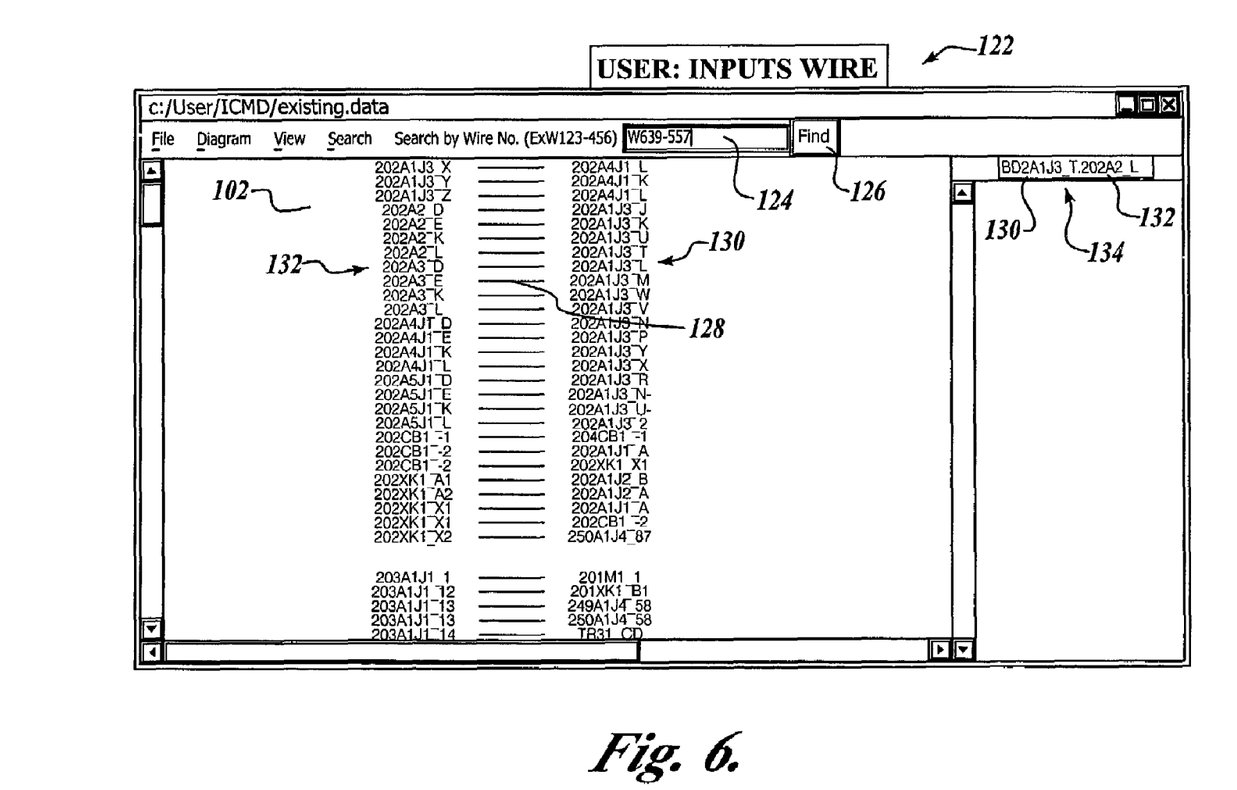

Referring now to FIG. 6, a screen 122 shows from endpoints and to endpoints for a desired wire segment. A user inputs a wire number in a field 124 and clicks on a find button 126. A line 128 is highlighted that represents the wire segment whose number is input in the field 124. From endpoints 130 and to endpoints 132 appear next to the line 128. Advantageously, the to endpoints 132 are shown in the box 102 as being part of a system. A field 134 displays the from endpoint 130 and the to endpoint 132. In the non-limiting example shown, a user inputs wire number W639-557 in the field 124 and clicks on the find button 126. The line 128 is highlighted between a from endpoint that is equipment termination point designated as 202A1J3_T, and a to endpoint that is equipment termination point designated as 202A2_L. The to endpoints are shown in the box 102 as being part of a system 202. The field 134 shows the from endpoint and the to endpoint as "202A1J3_T. 20A2_L".

Figure 7:
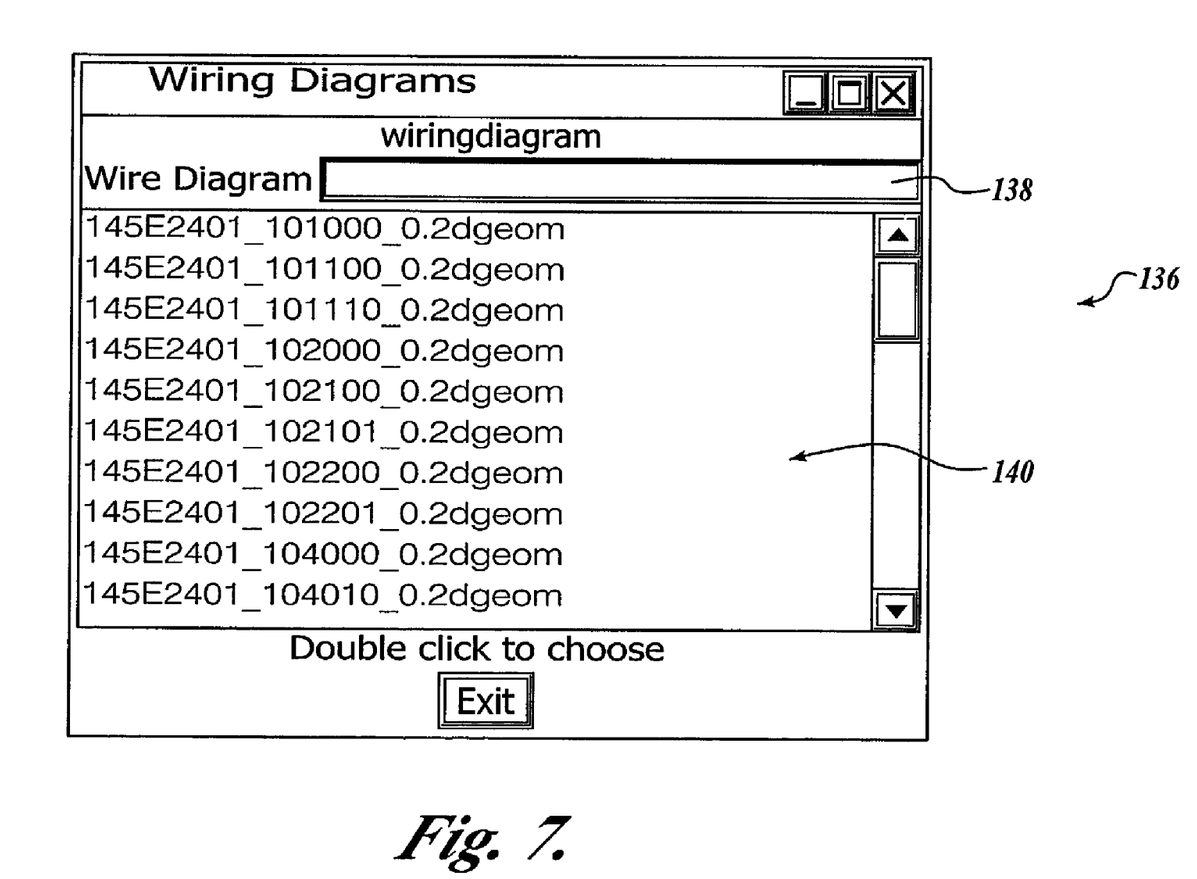
Figure 8:
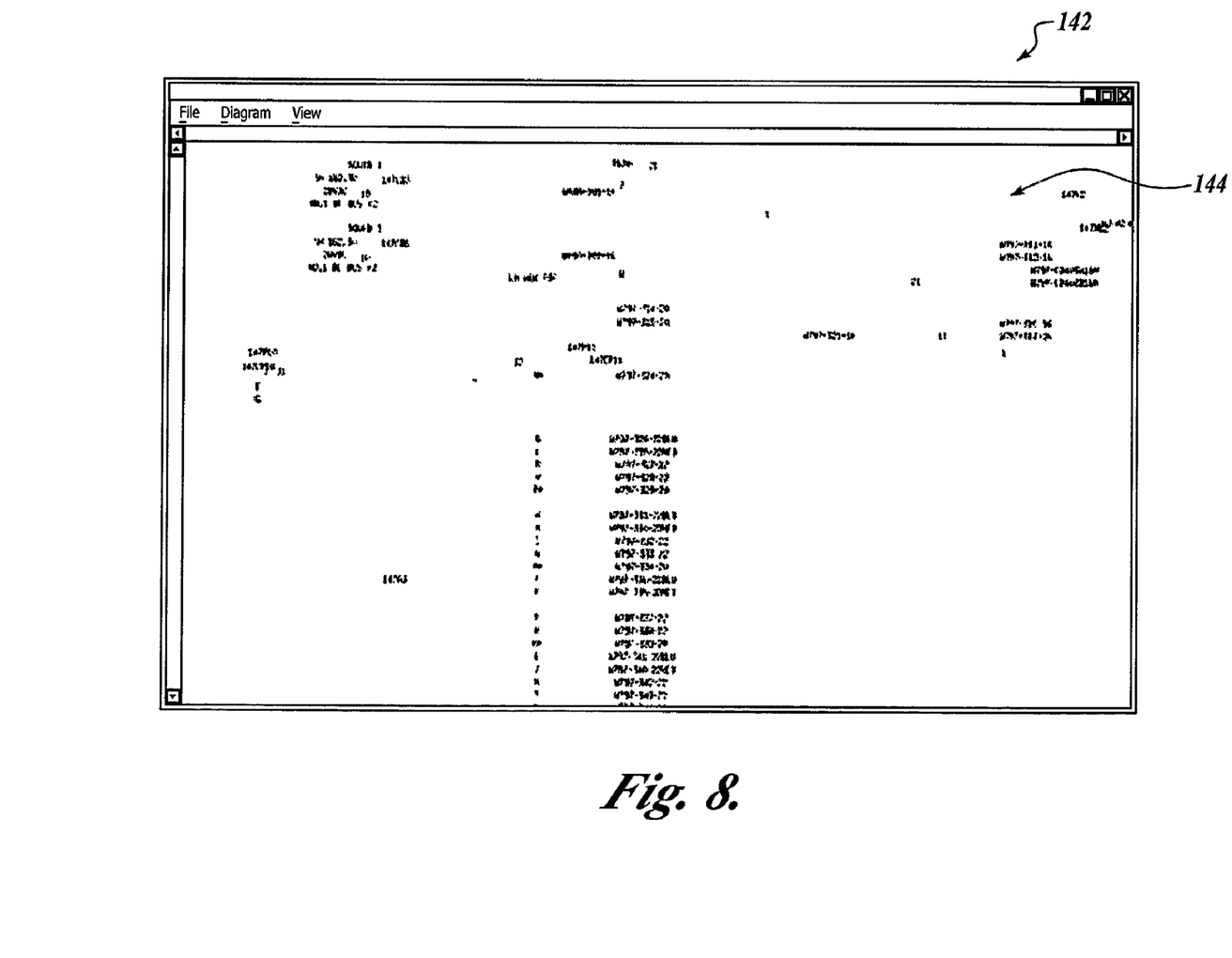
Figure 9:
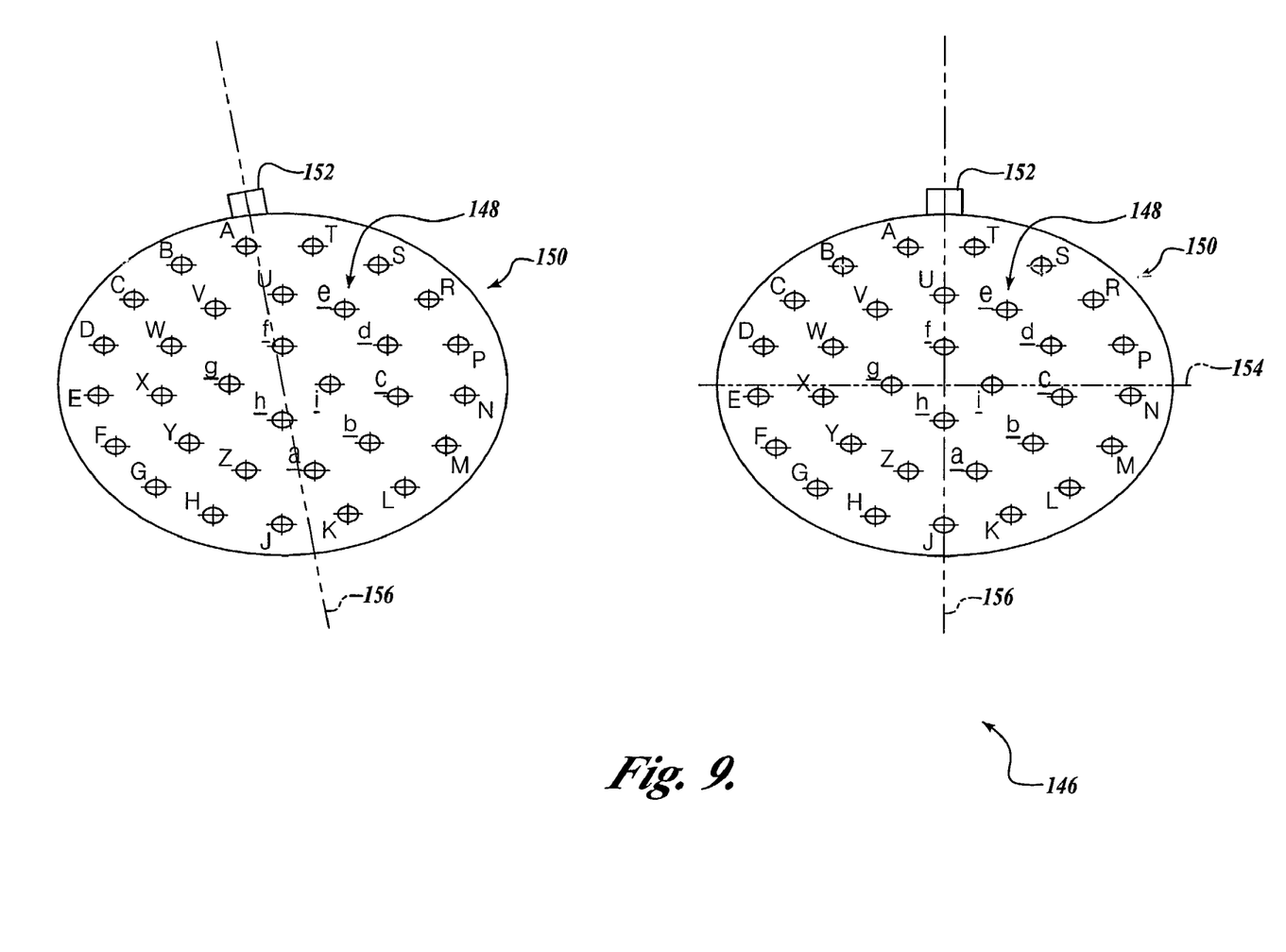

Referring now to FIGS. 7 and 8, a user may select a wire diagram for viewing. A window 136 includes a field 138 into which a wire diagram number, schematic, or reference document number is entered. In one embodiment of the invention, a wire diagram number is suitably selected by highlighting a wire number diagram from a plurality of wire diagram numbers 140. To select the desired wire diagram number from the plurality of wire diagram numbers 140, the user suitably double clicks on the desired wire diagram or reference document number. In response, a screen 142 shows a wire diagram 144 of the wire diagram number selected from the plurality of wire diagram numbers 140. Referring now to FIGS. 7, 8, and 9, if desired the wire diagram may also suitably include a connector plug map 146. In one non-limiting embodiment of the invention, the plug map 146 displays a pin-out 148 of a connector 150. The plug map 146 suitably indicates a main keyway 152 for the connector 150. Advantageously, the plug map 146 also indicates correct installation of an insert (not shown) via a line 156.

Figure 10:
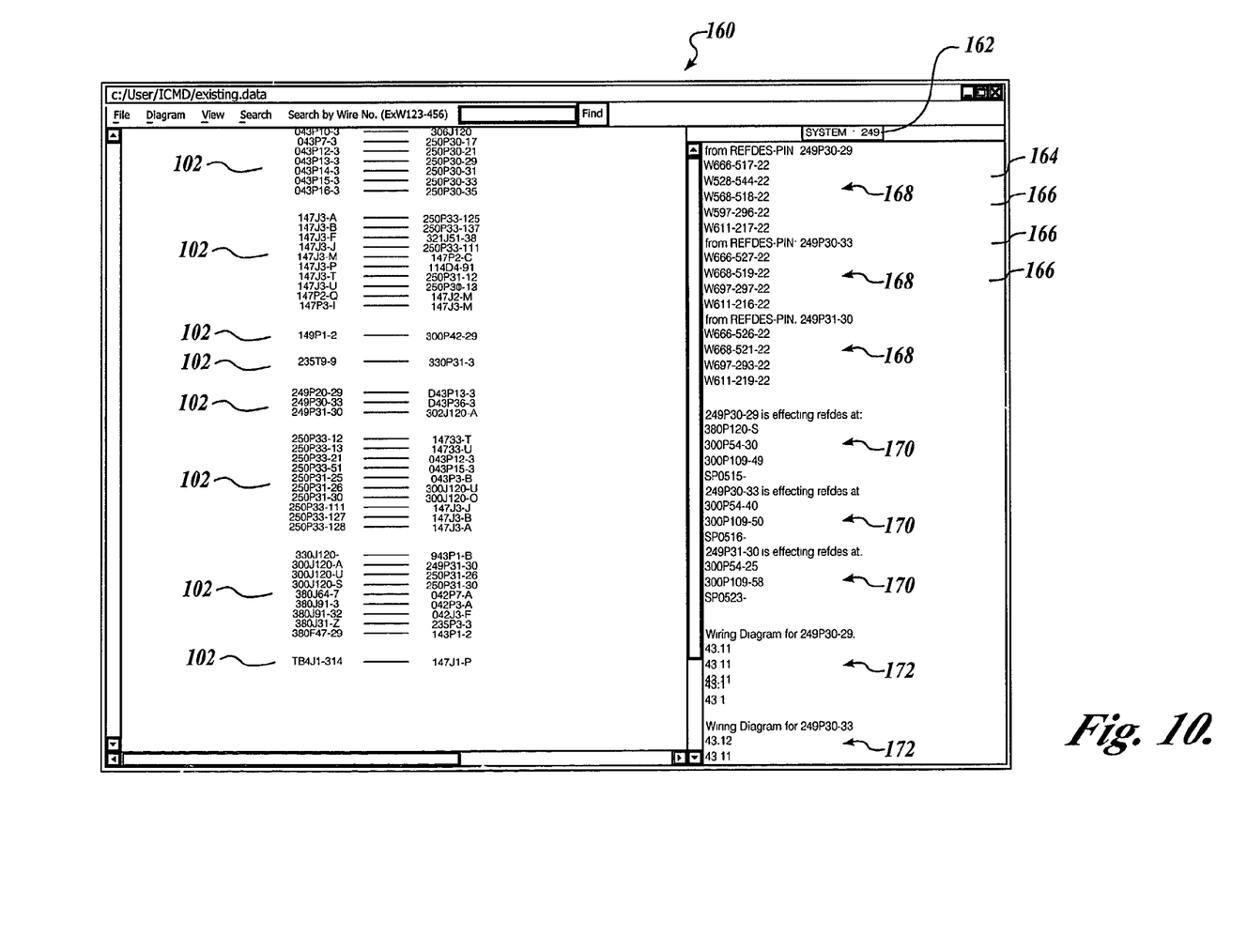

Referring now to FIG. 10, a screen 160 displays information useful for troubleshooting a system, piece of equipment, unit, or the like. Pieces of equipment that make up a system are grouped into the boxes 102. A user selects a system to troubleshoot by clicking on the desired system in one of the boxes 102. Given by way of non-limiting example, the system 249 is selected. A box 162 displays the name or system number of the selected system. For example, the box 162 displays the system number 249.

A window 164 displays pin numbers 166. It will be appreciated that the pin numbers 166 are the from endpoints of the selected system and are shown in the selected box 102. Wire numbers 168 that are connected to the pin numbers 166 are displayed in the window 164. For example, the wires W666-517-22, W528-544-22, W668-518-22, W697-296-22, and W611-217-22 are connected to the pin 249P30-29.

Advantageously, the window 164 displays connection points 170 that are used by the pin numbers 166 in the selected system. For example, the equipment termination points designated as 300P120-S, 300-P54-38, 300P109-49, and SP0515- are used by the equipment termination point designated as 249P30-29. Advantageously, the part numbers of the connection devices can be displayed.

The window 164 also displays wiring diagrams 172 in which the pin numbers 166 in the selected system are displayed. For example, the pin number 249P30-29 is displayed on wiring diagrams 43.11 and 43.1.

Exemplary Host Environment

FIGS. 1–10 are flowchart and screen shot illustrations of methods and computer program products according to the invention. It will be understood that each block or step of the flowchart and screen shot illustrations, and combinations of blocks in the flowchart and screen shot illustrations, can be implemented by computer program instructions or other means, such as operator interaction. Although computer program instructions are discussed herein below, for example, an apparatus according to the present invention can include other means, such as hardware or some combination of hardware and software, including one or more processors or controllers for reading the data for the wire segments, concluding endpoints, searching for plugs and jacks, or generating graphics data.

Figure 11:
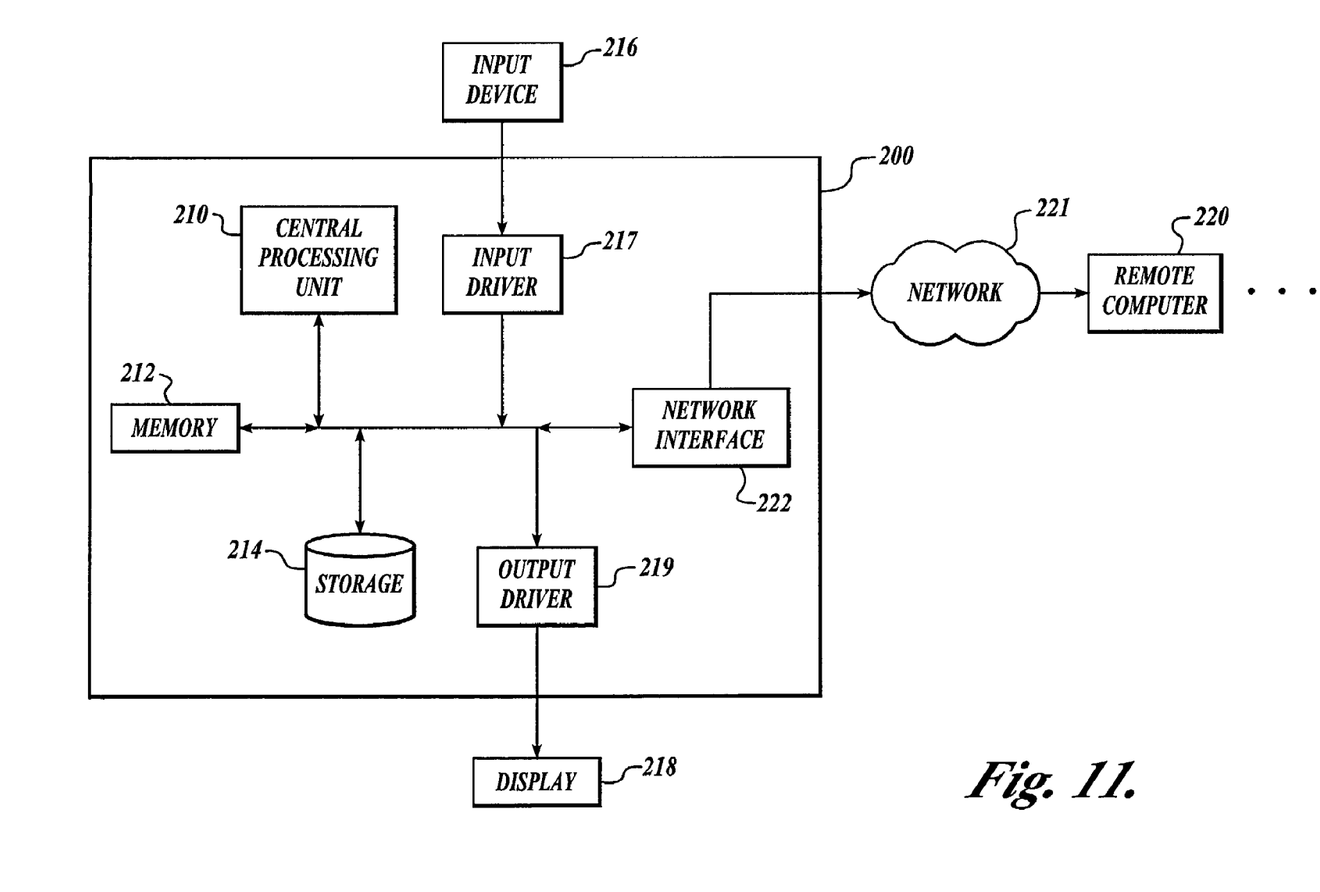
FIG. 11 is a block diagram of an exemplary host environment of the present invention.

In this regard, FIG. 11 depicts the apparatus of one exemplary host embodiment including several of the key components of a general purpose computer 200 on which the present invention may be implemented. Those of ordinary skill in the art will appreciate that a computer includes many more components than those shown in FIG. 11. However, it is not necessary that all of these generally conventional components be shown in order to disclose an illustrative embodiment for practicing the invention. The computer 200 includes a processing unit 210 and a memory 212, which suitably includes random access memory (RAM) and read-only memory (ROM) of any acceptable variant. The computer 200 also includes storage 214, such as a hard disk drive, where data, such as wire segment data, and applications may be stored. The apparatus of the present invention can also include one or more input devices 216, such as a mouse, keyboard, voice recognition device, bar code, etc., that are connected to an input driver 217 that is included in the computer 200 for inputting wire segment data. A display 218 is provided for graphics data, and interacting with a user interface to request troubleshooting operations. The display 218 is connected to an output driver 219 that is included in the computer 200. The apparatus of the present invention may be a stand-alone unit or may be connected to one or more remote computers 220 through a network 221 via a network interface 222. The network 221 suitably includes a local area network (LAN), a wide are network (WAN), an intranet, an extranet, or the Internet. As is known, the network interface 222 includes all of the necessary circuitry for such a connection, either physically connected or in wireless communication, to the network 221. In one embodiment of the present invention, the wire segment data is available on the remote computer(s) 220 and accessible via the network 221. It will be appreciated that other embodiments are possible, including: a local wire segment data collection, that is, all wire segment data is stored on the computer 200; wire segment data stored on a server and/or a client in a network environment; and the like.

Typically, computer program instructions may be loaded onto the computer or other programmable apparatus to produce a machine, such that the instructions which execute on the computer or other programmable apparatus create means for implementing the functions specified in the flowcharts or screen shot block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart or screen shot block(s) or step(s). The computer program instructions may also be loaded onto the computer or other programmable apparatus to cause a series of operational steps to be performed on the computer or other programmable apparatus to produce a computer implemented process such that the instructions which execute on the computer or other programmable apparatus provide steps for implementing the functions specified in the flowchart or screen shot block(s) or step(s).

Accordingly, blocks or steps of the flowchart or screen shot illustrations support combinations of means for performing the specified functions and program instruction means for performing the specified functions. It will also be understood that each block or step of the flowchart or screen shot illustrations, and combinations of blocks or steps in the flowchart or screen shot illustrations, can be implemented by special purpose hardware-based computer systems which perform the specified functions or steps, or combinations of special purpose hardware and computer instructions.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for troubleshooting interconnections between systems, the method comprising:
   inputting data for a plurality of equipment segments for a plurality of systems;
   reading the data for the plurality for equipment segments;
   calculating from and to end points of the equipment segments, wherein calculating from and to end points includes:
      searching for a first connector number that corresponds to a second connector number when equipment segment data that is read includes the second connector number; and
      searching for a second connector number that corresponds to a first connector number when equipment segment data that is read includes the first connector number;
   automatically generating graphics data for the plurality of equipment segments; and
   displaying the graphics data for the plurality of equipment segments.

2. The method of claim 1, wherein the second connector number is different from the first connector number.

3. The method of claim 1, wherein the second connector number is the same as the first connector number.

4. The method of claim 1, wherein:
   the corresponding first connector is connected to the second connector when the corresponding first connector number is found; and
   the corresponding second connector is connected to the first connector when the corresponding second connector number is found.

5. The method of claim 1, wherein:
   the corresponding first connector is not connected to the second connector when the corresponding first connector number is not found; and
   the corresponding second connector is not connected to the first connector when the corresponding second connector number is not found.

6. The method of claim 1, further comprising:
   selecting a first system and a second system; and
   automatically finding any disconnects between the first and second systems.

7. The method of claim 1, further comprising:
   identifying one of the equipment segments; and
   automatically determining from and to endpoints of the identified equipment segment.

8. The method of claim 1, further comprising:
   identifying one of the equipment segments; and
   automatically displaying a diagram of the identified equipment segment.

9. The method of claim 1, wherein the equipment segments include wire segments.

10. The method of claim 9, further comprising:
    identifying one of the wire segments; and
    automatically displaying a plug map of connectors for the wire segment.

11. The method of claim 1, further comprising:
    identifying one of the systems; and
    automatically displaying graphics data for equipment segments within the identified system.

12. A system for interactively troubleshooting interconnections between systems, the system comprising:
    an input device for inputting data for a plurality of equipment segments for a plurality of systems;
    an input interface for reading the data for the plurality of equipment segments;
    a processor for calculating from and to endpoints of the equipment segments, wherein the processor further calculates from and to end points by;
       searching for a first connector number that corresponds to a second connector number when equipment segment data that is read includes the second connector number; and
       searching for a second connector number that corresponds to a first connector number when equipment segment data that is read includes the first connector number;
    a graphics generator for automatically generating graphics data for the plurality of equipment segments; and
    a display device for displaying the graphics data for the plurality of the equipment segments.

13. The system of claim 12, wherein the second connector number is different from the first connector number.

14. The system of claim 12, wherein the second connector number is the same as the first connector number.

15. The system of claim 12, wherein:
    the corresponding first connector is connected to the second connector when the corresponding first connector number is found; and
    the corresponding second connector is connected to the first connector when the corresponding second connector number is found.

16. The system of claim 12, wherein:
    the corresponding first connector is not connected to the second connector when the corresponding first connector number is not found; and
    the corresponding second connector is not connected to the first connector when the corresponding second connector number is not found.

17. The system of claim 12, wherein a first system and a second system are selected, and wherein the processor automatically finds any disconnects between the first and second systems.

18. The system of claim 12, wherein one of the equipment segments is identified, and the processor automatically determines from and to endpoints of the identified equipment segment.

19. The system of claim 12, wherein one of the equipment segments is identified, and the display device automatically displays a diagram of the identified equipment segment.

20. The method of claim 12, wherein the equipment segments include wire segments.

21. The system of claim 20, wherein one of the wire segments is identified, and the display device automatically displays a plug map of connectors for the wire segment.

22. The system of claim 12, wherein one of the systems is identified, and the display device automatically displays graphics data for equipment segments within the identified system.

23. A system for interactively troubleshooting wiring interconnections between electronic systems, the system comprising:
- an input device for imputing data for a plurality of wire segments for a plurality of electronics systems;
- an input interface for reading the data for the plurality of wire segments;
- a processor for calculating from and to endpoints of the wire segments, the processor being arranged to search for a first connector number that corresponds to a second connector number when wire segment data that is read includes the second connector number and to search for a second connector number that corresponds to a first connector number when wire segment data that is read includes the first connector number, wherein:
  - the corresponding first connector number is connected to the second connector number when the corresponding first connector number is found and the corresponding second connector number is connected to the first connector number when the corresponding second connector number is found; and further wherein
  - the corresponding first connector number is not connected to the second connector number when the corresponding first connector number is not found and the corresponding second connector number is not connected to the first connector number when the corresponding second connector number is not found;
- a graphics generator for automatically generating graphics data for the plurality of wire segments; and
- a display device for displaying the graphics data for the plurality of the wire segments.

24. The system of claim 23, wherein a first electronics system and a second electronics system are selected, and wherein the processor automatically finds any disconnects between the first and second electronics systems.

25. The system of claim 23, wherein one of the wire segments is identified, and the processor automatically determines from and to endpoints of the identified wire segment.

26. The system of claim 23, wherein the input device includes at least one of a keyboard and a voice-recognition device.

* * * * *